(12) United States Patent
Izumi

(10) Patent No.: US 10,876,537 B2
(45) Date of Patent: Dec. 29, 2020

(54) FAN MOTOR CONTROL DEVICE

(71) Applicant: FANUC CORPORATION, Yamanashi (JP)

(72) Inventor: Ryosuke Izumi, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 295 days.

(21) Appl. No.: 15/833,588

(22) Filed: Dec. 6, 2017

(65) Prior Publication Data

US 2018/0156225 A1 Jun. 7, 2018

(30) Foreign Application Priority Data

Dec. 7, 2016 (JP) ................... 2016-237200

(51) Int. Cl.
| | | |
|---|---|---|
| *F04D 27/00* | (2006.01) | |
| *H02K 11/21* | (2016.01) | |
| *H02P 29/024* | (2016.01) | |
| *F04D 25/06* | (2006.01) | |
| *F04D 25/16* | (2006.01) | |
| *H02K 7/14* | (2006.01) | |
| *H02P 31/00* | (2006.01) | |
| *H02P 6/17* | (2016.01) | |

(52) U.S. Cl.
CPC .......... *F04D 27/001* (2013.01); *F04D 25/06* (2013.01); *F04D 25/166* (2013.01); *F04D 27/004* (2013.01); *H02K 7/14* (2013.01); *H02K 11/21* (2016.01); *H02P 29/0241* (2016.02); *H02P 31/00* (2013.01); *H02P 6/17* (2016.02)

(58) Field of Classification Search
CPC .... F04D 25/166; F04D 27/001; F04D 27/005; F04D 29/584
See application file for complete search history.

(56) References Cited

U.S. PATENT DOCUMENTS

| | | | | |
|---|---|---|---|---|
| 5,610,594 | A * | 3/1997 | Baumann ............. | G01R 23/155 340/658 |
| 6,400,113 | B1 * | 6/2002 | Garcia ................. | F04D 27/001 318/268 |
| 8,773,048 | B2 * | 7/2014 | Sato ...................... | F04D 25/166 318/67 |
| 2019/0293076 | A1 * | 9/2019 | Lai ........................ | F04D 25/166 |

FOREIGN PATENT DOCUMENTS

| | | |
|---|---|---|
| CN | 1747319 A | 3/2006 |
| CN | 101675250 A | 3/2010 |
| CN | 102384100 A | 3/2012 |
| CN | 104052348 A | 9/2014 |
| CN | 104584423 A | 4/2015 |

(Continued)

*Primary Examiner* — Patrick Hamo
(74) *Attorney, Agent, or Firm* — Hauptman Ham, LLP

(57) ABSTRACT

A fan motor control device configured to control driving of a fan motor for cooling a CPU includes: a rotational speed sensor configured to detect a rotational speed of the fan motor; and an abnormality decision control unit configured to execute an abnormality decision mode of repeatedly switching between on and off of power supply to the fan motor during an operation of the CPU, and determine abnormality of the fan motor based on the rotational speed of the fan motor during the execution of the abnormality decision mode.

15 Claims, 7 Drawing Sheets

(56) References Cited

FOREIGN PATENT DOCUMENTS

| CN | 104967364 A | 10/2015 |
|---|---|---|
| DE | 100 40 440 A1 | 3/2002 |
| JP | H05187392 A | 7/1993 |
| JP | 2000166272 A | 6/2000 |
| JP | 2008-208806 A | 9/2008 |
| JP | 2015108468 A | 6/2015 |
| JP | 2016115641 A | 6/2016 |

* cited by examiner

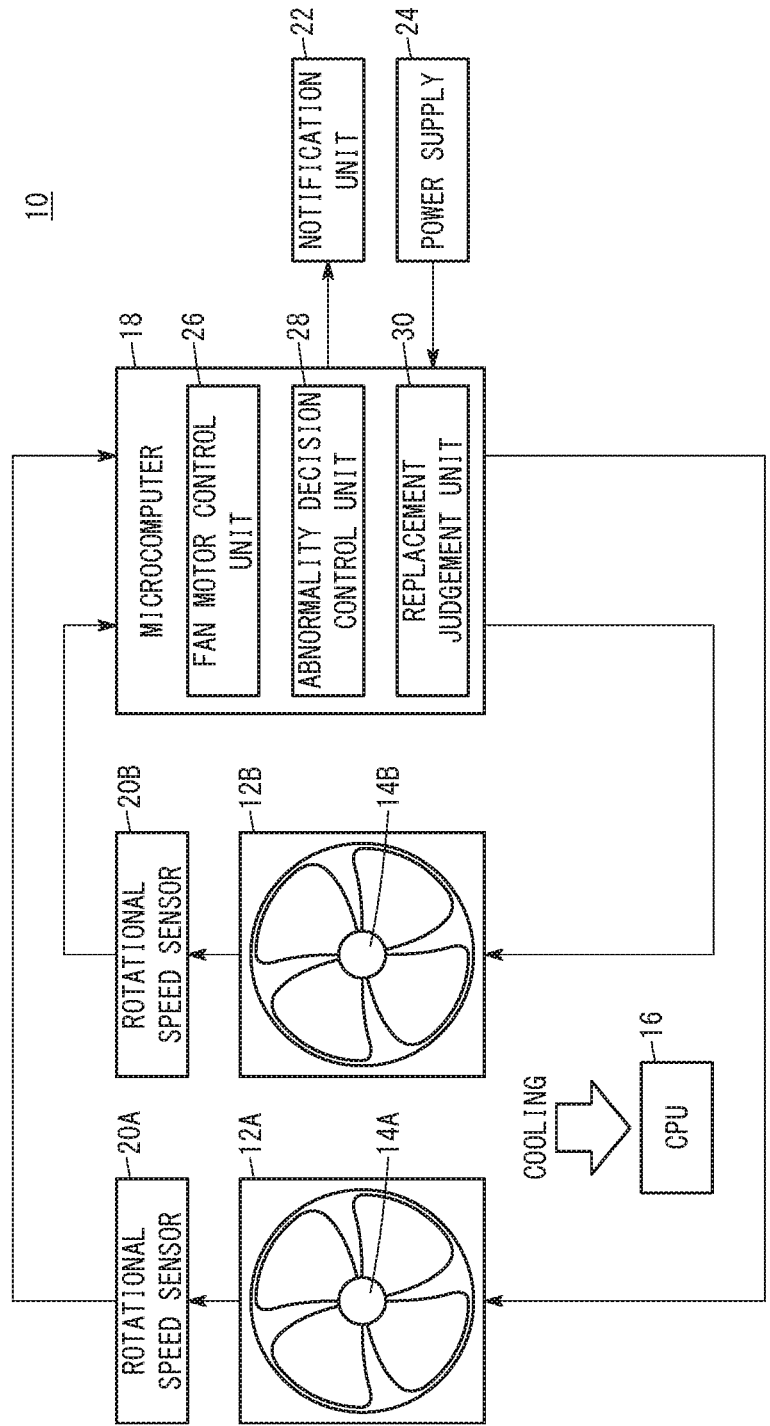

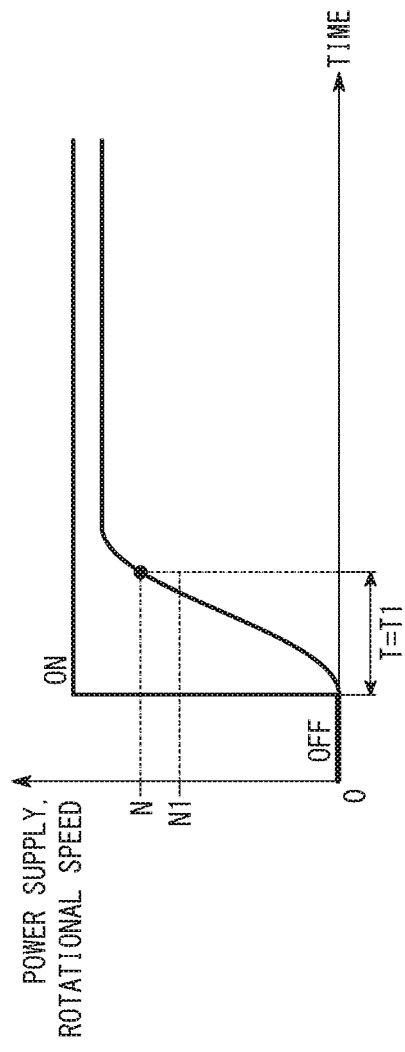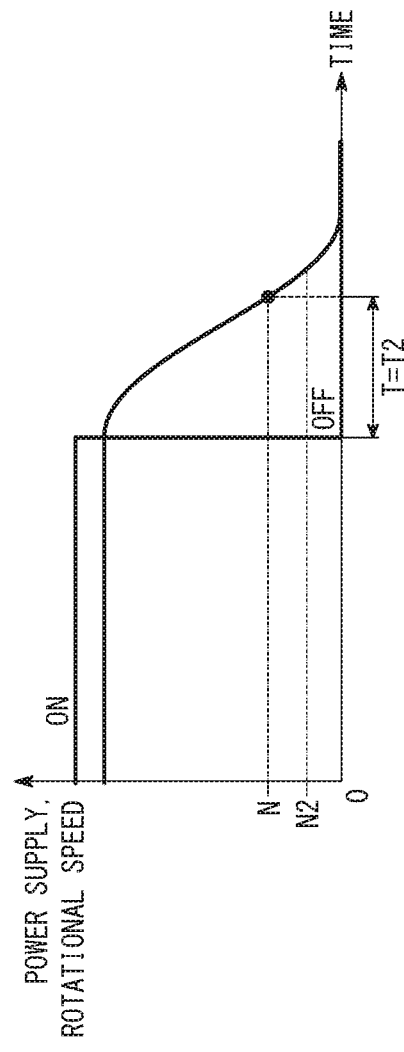

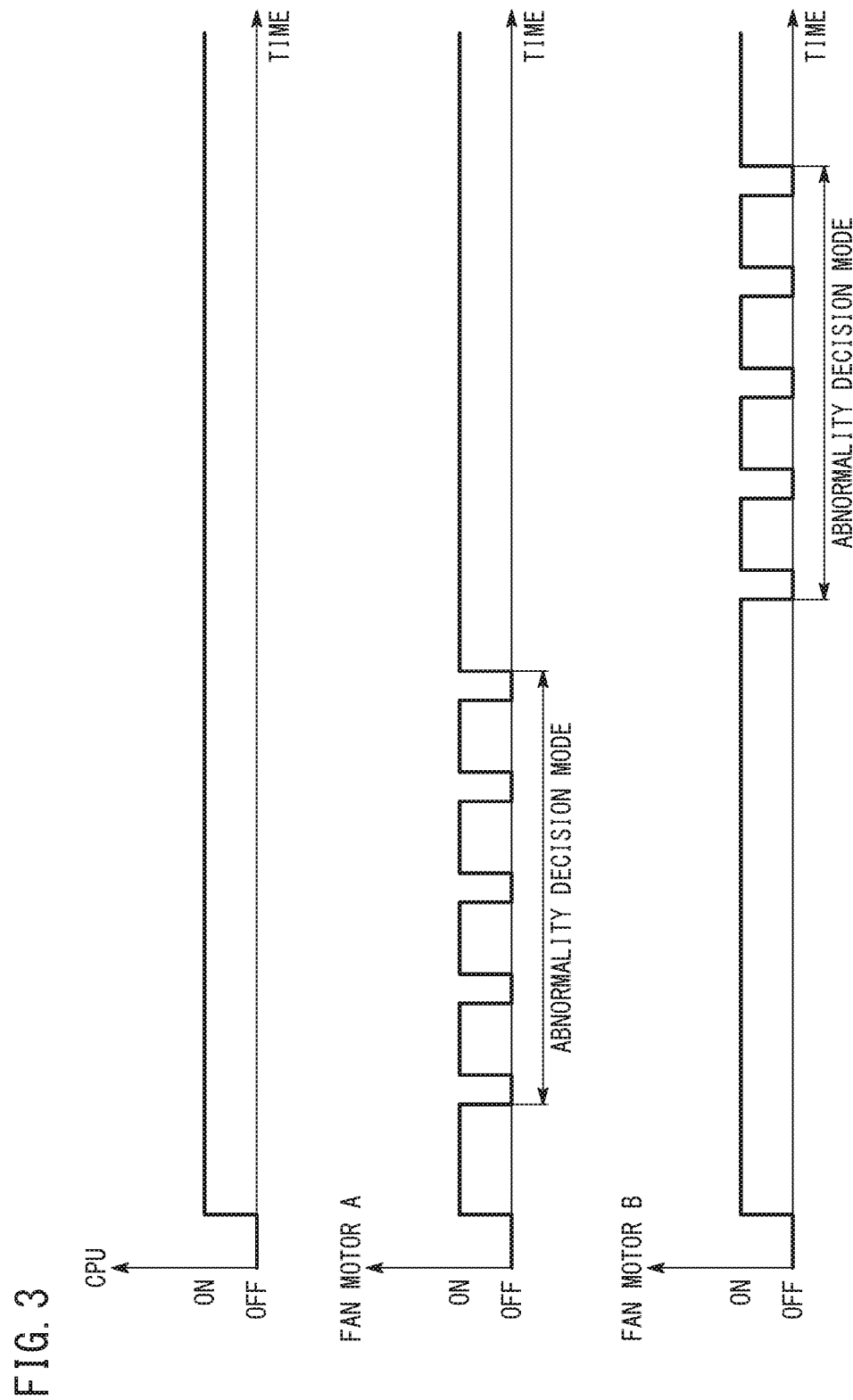

FAN MOTOR CONTROL DEVICE

CROSS-REFERENCE TO RELATED APPLICATION

This application is based upon and claims the benefit of priority from Japanese Patent Application No. 2016-237200 filed on Dec. 7, 2016, the contents of which are incorporated herein by reference.

BACKGROUND OF THE INVENTION

Field of the Invention

The present invention relates to a fan motor control device that controls driving of a fan motor.

Description of the Related Art

Japanese Laid-Open Patent Publication No. 05-187392 discloses a technique as a device that detects an abnormality of a fan motor. Japanese Laid-Open Patent Publication No. 05-187392 discloses a device which judges that the fan motor is abnormal when a rotational speed fails to reach a set rotational speed within a set time after activation of the fan motor.

SUMMARY OF THE INVENTION

The technique of Japanese Laid-Open Patent Publication No. 05-187392 has a problem that the abnormality of the fan motor can be determined only at a time of activation of the motor, providing limited opportunities for the judgement.

The present invention has been made to solve the above problem. An object of the present invention is to provide a fan motor control device that can increase the frequency of the judgement of fan motor abnormality to improve decision accuracy with respect to the fan motor abnormality.

A first aspect of the present invention is a fan motor control device configured to control driving of a fan motor for cooling a device that generates heat during operation, the fan motor control device including: a rotational speed detecting unit configured to detect a rotational speed of the fan motor; and an abnormality decision control unit configured to execute an abnormality decision mode of repeatedly switching between on and off of power supply to the fan motor during the operation of the device, and judge abnormality of the fan motor based on the rotational speed of the fan motor during the execution of the abnormality decision mode.

A second aspect of the present invention is a fan motor controlling method for controlling driving of a fan motor for cooling a device that generates heat during operation, the method including: a rotational speed detecting step of detecting a rotational speed of the fan motor; and an abnormality decision controlling step of executing an abnormality decision mode of repeatedly switching between on and off of power supply to the fan motor during the operation of the device, and determining abnormality of the fan motor based on the rotational speed of the fan motor during the execution of the abnormality decision mode. According to the present invention, it is possible to improve decision accuracy with respect to the fan motor abnormality.

The above and other objects features and advantages of the present invention will become more apparent from the following description when taken in conjunction with the accompanying drawings in which a preferred embodiment of the present invention is shown by way of illustrative example.

BRIEF DESCRIPTION OF THE DRAWINGS

FIG. 1 is a block diagram of a fan motor control device;

FIG. 2A is an explanatory diagram showing how to judge abnormality when power supply to a fan motor is switched from off to on;

FIG. 2B is an explanatory diagram showing how to judge abnormality when power supply to the fan motor is switched from on to off;

FIG. 3 is an explanatory diagram of an abnormality decision mode;

DESCRIPTION OF THE PREFERRED EMBODIMENTS

Figure 4:
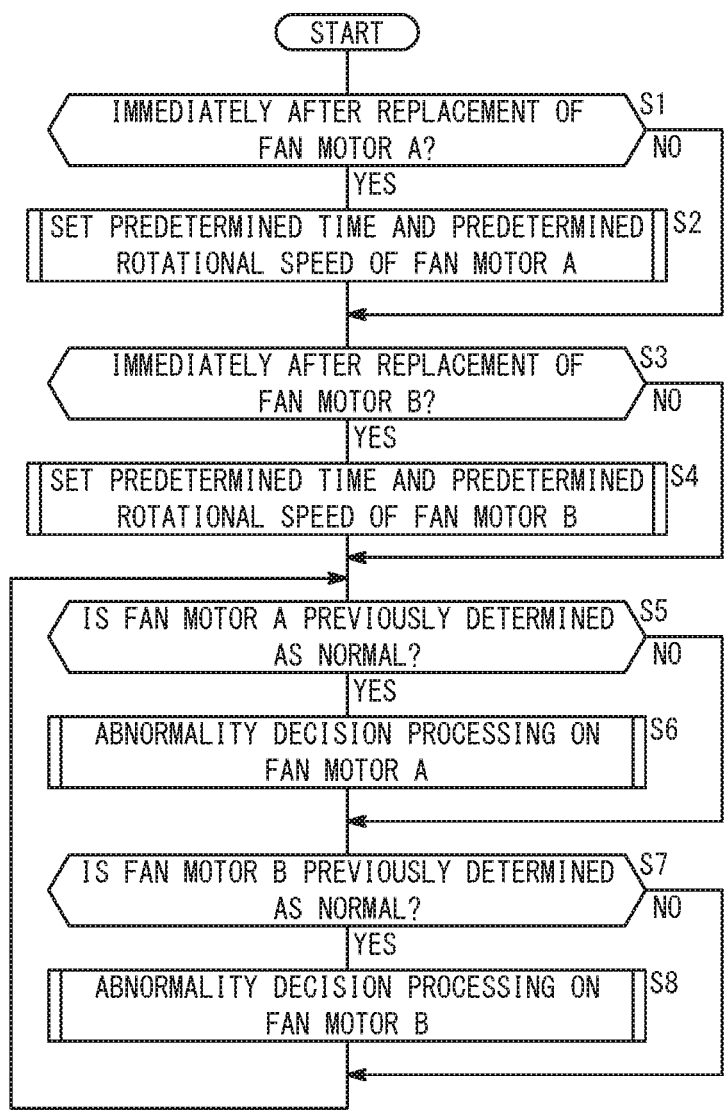
FIG. 4 is a flowchart illustrating fan motor abnormality decision control.

Preferred embodiments of a fan motor control device according to the present invention will be described in detail below with reference to the accompanying drawings.

First Embodiment

[Configuration of Fan Motor Control Device]

FIG. 1 is a block diagram of a fan motor control device 10. The fan motor control device 10 controls driving of a fan motor 14A and a fan motor 14B that drive and rotate a fan 12A and a fan 12B, respectively. The fans 12A, 12B and the fan motors 14A, 14B will be respectively referred to as the fan 12 and the fan motor 14 below when generally explained. The fan 12 discharges air from the inside of a housing of a numerical control device that controls an unillustrated machine tool to facilitate cooling of a device such as a CPU 16 inside the housing. A rotational speed of the fan motor 14 may be controlled by varying a supply voltage (supply current) by pulse control. However, the explanation of the present embodiment will be made based on the rotational speed controlled by varying the supply voltage.

The fan motor control device 10 includes a microcomputer 18, rotational speed sensors 20A, 20B, a notification unit 22 and a power supply 24. The microcomputer 18 includes a microprocessor, and the microcomputer 18 includes a fan motor control unit 26, an abnormality decision control unit 28 and a replacement judgement unit 30.

The rotational speed sensors 20A, 20B respectively detect the rotational speeds of the fan motors 14A, 14B, and output information of the detected rotational speeds to the microcomputer 18. The notification unit 22 notifies an operator operating the machine tool of the abnormality through sounds, characters, images, light or a combination thereof based on a command from the abnormality decision control unit 28 to. The fan motor control unit 26 controls a power voltage supplied from the power supply 24 to the fan motors 14A, 14B according to a temperature of the CPU 16 to control the rotational speeds of the fan motors 14A, 14B. Hereinafter, to simplify an example of the present embodiment, the explanation will be made base on the assumption that the fan motor control unit 26 controls such that a rated voltage is supplied to the fan motors 14A, 14B so that the rotational speeds of the fan motors 14A, 14B are to be a rated rotational speed.

The abnormality decision control unit 28 determines an abnormality of the fan motors 14A, 14B. When executing an abnormality decision mode described below with respect to the fan motors 14A, 14B, the abnormality decision control unit 28 controls the fan motors 14A, 14B. The abnormality decision control unit 28 determines the fan motor 14A or the fan motor 14B as abnormal, and then controls the fan motors 14A, 14B. The replacement judgement unit 30 decides that the fan motors 14A, 14B have been replaced.

[Judgement on Fan Motor Abnormality]

A basic concept of abnormality judgement with respect to the fan motor 14 will be described. FIG. 2A is an explanatory diagram showing how to judge abnormality of the fan motor 14 when the power supply to the fan motor 14 is switched from off to on. The abnormality decision control unit 28 judges that the fan motor 14 is normal when a rotational speed N of the fan motor 14 is a predetermined rotational speed N1 or more at a predetermined time T1 after power supply to the fan motor 14 is switched from off to on. On the other hand, the abnormality decision control unit 28 judges that the fan motor 14 is abnormal, when the rotational speed N of the fan motor 14 is less than the predetermined rotational speed N1 at the predetermined time T1 after the power supply to the fan motor 14 is switched from off to on.

FIG. 2B is an explanatory diagram showing how to judge abnormality of the fan motor 14 when the power supply to the fan motor 14 is switched from on to off. The abnormality decision control unit 28 judges that the fan motor 14 is normal when the rotational speed N of the fan motor 14 is a predetermined rotational speed N2 or more at a predetermined time T2 after the power supply to the fan motor 14 is switched from on to off. On the other hand, the abnormality decision control unit 28 judges that the fan motor 14 is abnormal when the rotational speed N of the fan motor 14 is less than the predetermined rotational speed N2 at the predetermined time T2 after the power supply to the fan motor 14 is switched from on to off.

The judgement of the abnormality of the fan motor 14 in the case where the power supply to the fan motor 14 is switched from off to on will be described in more detail below. The judgement of the abnormality of the fan motor 14 in the case where the power supply to the fan motor 14 is switched from on to off can be also performed in substantially the same manner.

[Abnormality Decision Mode]

Normally, the fan motor control unit 26 switches the power supply to the fan motor 14 from off to on when the CPU 16 is activated, and switches the power supply to the fan motor 14 from on to off after the CPU 16 is stopped. The above judgement of the abnormality of the fan motor 14 is performed when the power supply to the fan motor 14 is switched from off to on or from on to off. Therefore, opportunities for performing judgements on the abnormality of the fan motor 14 are limited.

In the present embodiment, even during an operation of the CPU 16, the abnormality decision control unit 28 executes an abnormality decision mode of repeatedly switching between power on and power off of the fan motor 14, and increases frequency of the judgement of the abnormality of the fan motor 14.

FIG. 3 is a view for explaining the abnormality decision mode. FIG. 3 illustrates the fan motor 14A as "fan motor A" and the fan motor 14B as "fan motor B". As shown in FIG. 3, while the CPU 16 is in operation, the abnormality decision mode of repeatedly switching between on and off of the power supply to the fan motor 14A is executed. When the abnormality decision mode is executed with respect to the fan motor 14A, the abnormality decision mode is not executed with respect to the fan motor 14B. After execution of the abnormality decision mode with respect to the fan motor 14A is finished, the abnormality decision mode is executed with respect to the fan motor 14B. While the abnormality decision mode is executed with respect to the fan motor 14B, the abnormality decision mode is not executed with respect to the fan motor 14A.

While the abnormality decision mode is executed with respect to the fan motor 14A, the abnormality decision control unit 28 controls the rotational speed of the fan motor 14B to be higher than the rotational speed before the abnormality decision mode is executed with respect to the fan motor 14A. Similarly, while the abnormality decision mode is executed with respect to the fan motor 14B, the abnormality decision control unit 28 controls the rotational speed of the fan motor 14A to be higher than the rotational speed before the abnormality decision mode is executed with respect to the fan motor 14B. With this arrangement, degradation of performance in cooling the CPU 16 or the like during execution of the abnormality decision mode with respect to one of the fan motors 14 can be compensated for by the other one of the fan motors 14.

In the present embodiment, during one abnormality decision mode, the power supply to the fan motor 14 is repeatedly switched between off and on five times. However, the number of times may be larger than five times or may be less than five times. The abnormality decision mode may be executed a plurality of times during the operation of the CPU 16 or may be performed only once. The abnormality decision mode may be executed every time the CPU 16 is activated or may be performed once in several times of activation of the CPU 16. The present embodiment describes an example where the abnormality decision mode is executed with respect to the two fan motors 14A, 14B. Even when the abnormality decision mode is executed with respect to three or more fan motors, the abnormality decision mode may be executed with respect to one fan motor at a time, and the abnormality decision mode may not be executed with respect to the other fan motors.

[Abnormality Decision Control]

FIG. 4 is a flowchart illustrating abnormality decision control of the fan motors 14. FIG. 4 illustrates the fan motor 14A as the "fan motor A", and the fan motor 14B as the "fan motor B".

In step S1, the fan motor 14A is judged if it has just been replaced (if it is controlled to be driven for the first time after the replacement). If the fan motor 14A has just been replaced, the flow moves to step S2. If not, the flow goes to step S3. In step S2, a predetermined time and a predetermined rotational speed to be used for judgement of abnormality of the fan motor 14A are set, and the flow moves to step S3. The predetermined time and the predetermined rotational speed indicate the predetermined time T1 and the predetermined rotational speed N1 in FIG. 2A. The setting of the predetermined time and the predetermined rotational speed will be described in detail below with reference to FIGS. 5 and 6.

In step S3, the fan motor 14B is judged if it has just been replaced (if it is controlled to be driven for the first time after the replacement). If the fan motor 14B has just been replaced, the flow moves to step S4. If not, the flow moves to step S5. In step S4, a predetermined time and a predetermined rotational speed to be used for judgement of abnormality of the fan motor 14B are set, and the flow moves to step S5.

In step S5, a judgement result of previous step S6 is confirmed if the fan motor 14A is judged to be normal. If the fan motor 14A was judged as normal or has just been replaced, the flow moves to step S6. When the fan motor 14A was judged as abnormal, the flow moves to step S7. In step S6, abnormality decision processing is performed with respect to the fan motor 14A, and the flow moves to step S7.

In step S7, a judgement result of previous step S8 is confirmed if the fan motor 14B is judged to be normal. When the fan motor 14B was judged as normal or has just been replaced, the flow moves to step S8. If the fan motor 14B was judged as abnormal, the flow moves to step S5. In step S8, the abnormality decision processing is performed with respect to the fan motor 14B, and the flow moves to step S5. The abnormality decision processing with respect to the fan motors 14A, 14B will be described in detail below with reference to FIG. 7.

(Setting Process of Predetermined Time and Predetermined Rotational Speed)

The fan motors 14 are designed to drive at a predetermined rated rotational speed when power at a rated current and a rated voltage is supplied. The predetermined time and the predetermined rotational speed used for abnormality decision with respect to the fan motors 14 are given in advance based on the fan motors 14 as designed. However, even at the shipment of the fan motors 14 from manufacturers, performance varies depending on the products or degrades due to long-term storage. Some of the fan motors 14 are incapable of sufficiently exhibiting expected performance even immediately after replacement. Hence, in the present embodiment, the predetermined time and the predetermined rotational speed used for abnormality decision with respect to the fan motor 14 are compensated per fan motor 14.

Figure 5:
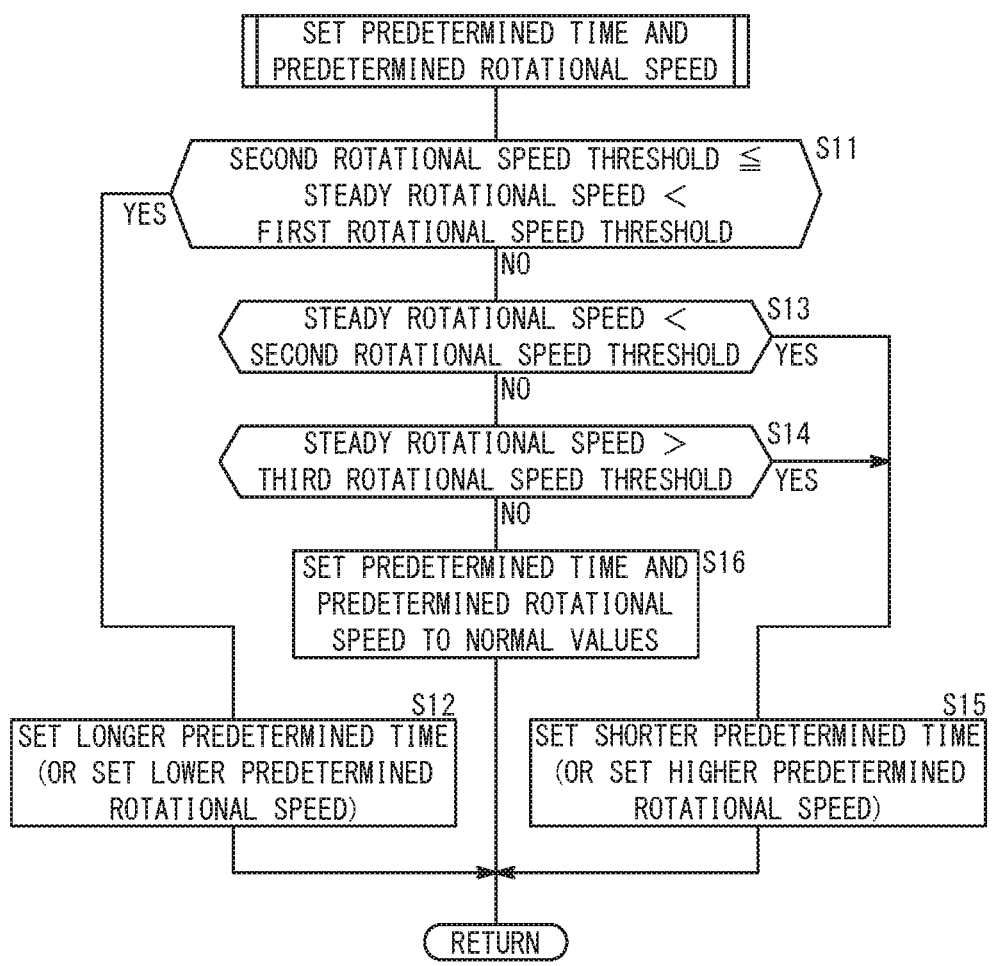
FIG. 5 is a flowchart illustrating a setting process of a predetermined time and a predetermined rotational speed.
Figure 6:
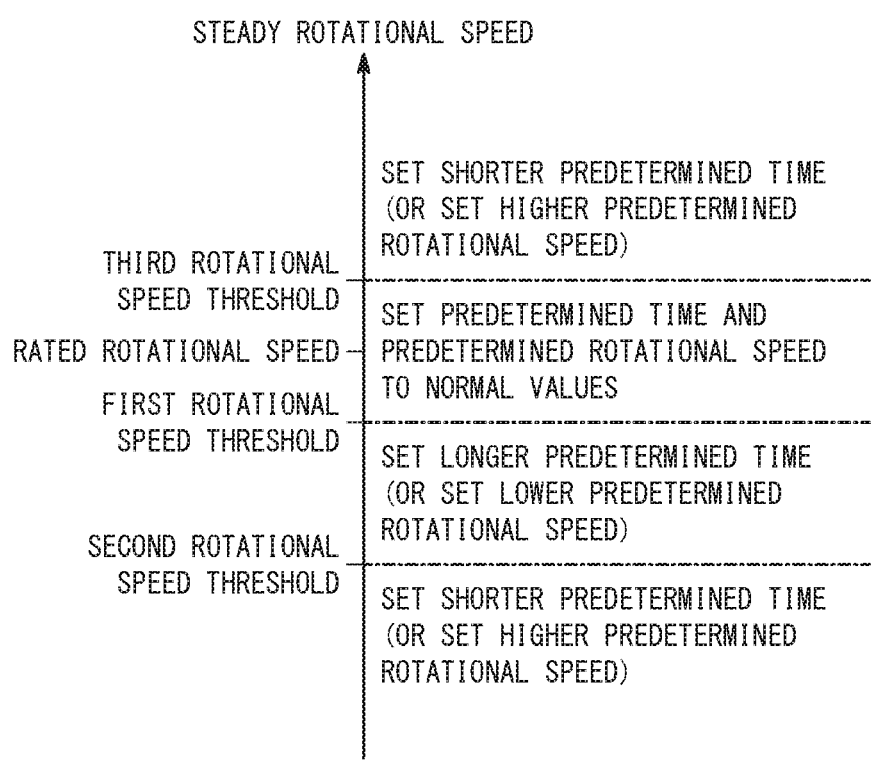
FIG. 6 is a view illustrating a relationship among a first rotational speed threshold, a second rotational speed threshold, a third rotational speed threshold and a rated rotational speed used in the setting process of the predetermined time and the predetermined rotational speed.

FIG. 5 is a flowchart illustrating the setting process of the predetermined time and the predetermined rotational speed. FIG. 6 is a view illustrating a relationship among a first rotational speed threshold, a second rotational speed threshold and a third rotational speed threshold, and a rated rotational speed used by the setting process of the predetermined time and the predetermined rotational speed. The same setting process of the predetermined time and the predetermined rotational speed is applied to both of the fan motors 14A, 14B. Hereinafter, only the setting processing of the predetermined time and the predetermined rotational speed used for the abnormality decision with respect to the fan motor 14A will be described.

The predetermined time and the predetermined rotational speed used for judgement of the abnormality of the fan motor 14A are set according to a steady rotational speed of the fan motor 14A driven at a rated voltage. The steady rotational speed is the average value of the rotational speed values measured approximately 100 times in a steady state where the rotational speed that has been changed since the fan motor 14A was powered on becomes stable after passage of a certain period of time.

In step S11, the steady rotational speed of the fan motor 14A is judged if it is smaller than the first rotational speed threshold and equal to or greater than the second rotational speed threshold. When the steady rotational speed of the fan motor 14A is smaller than the first rotational speed threshold, and is equal to or greater than the second rotational speed threshold, the flow moves to step S12. When the steady rotational speed of the fan motor 14A is equal to or greater than the first rotational speed threshold, or less than the second rotational speed threshold, the flow moves to step S13. Here, the first rotational speed threshold is set to be a rotational speed lower than the rated rotational speed of the fan motor 14A, and is set to, for example, a rotational speed that is −1[%] of the rated rotational speed of the fan motor 14A. The second rotational speed threshold is a rotational speed smaller than the first rotational speed threshold, and is set to, for example, a rotational speed that is −4[%] of the rated rotational speed of the fan motor 14A (see FIG. 6).

In step S12, the predetermined time is set longer than a preset time (or the predetermined rotational speed is set lower than the preset rotational speed). Setting the predetermined time longer than the preset time or setting the predetermined rotational speed lower than the preset rotational speed is to set the value for judging abnormality of the fan motor 14A less strictly (less likely to be judged as abnormal). This is because the steady rotational speed of the fan motor 14A that is slightly lower than the rated rotational speed has little influence on the performance for cooling the CPU 16 and the like, a rotation portion such as a bearing of the fan motor 14A would not be worn much and a long operational life of the fan motor 14A would be expectable.

In step S13, the steady rotational speed of the fan motor 14A is judged whether to be less than the second rotational speed threshold or not. When the steady rotational speed of the fan motor 14A is less than the second rotational speed threshold, the flow moves to step S15. When the rated rotational speed of the fan motor 14A is the second rotational speed threshold or more, the flow moves to step S14.

In step S14, the steady rotational speed of the fan motor 14A is judged to be greater than the third rotational speed threshold. When the steady rotational speed of the fan motor 14A is larger than the third rotational speed threshold, the flow moves to step S15. When the steady rotational speed of the fan motor 14A is less than the third rotational speed threshold, the flow moves to step S16. When the third rotational speed threshold is a rotational speed higher than the rated rotational speed of the fan motor 14A, and is set to, for example, a rotational speed that is +1[%] of the rated rotational speed of the fan motor 14A (see FIG. 6).

In step S15, the predetermined time is set shorter than the preset time (or the predetermined rotational speed is set higher than the preset rotational speed). Setting the predetermined time shorter than the preset time or setting the predetermined rotational speed higher than the preset rotational speed is to set the value for judging abnormality of the fan motor 14A more strictly (more likely to be judged as abnormal). This is because the steady rotational speed of the fan motor 14A is far lower than the rated rotational speed, the rotation portion such as a bearing of the fan motor 14A is in bad condition, grease starts to be solidified at the rotation portion, the long operational life of the fan motor 14 cannot be expected, and therefore an operator is encouraged to quickly prepare a replacement. Alternatively, when the steady rotational speed of the fan motor 14A is higher than the rated rotational speed, the rotation portion such as the bearing quickly wears away, the long operational life of the fan motor 14A cannot be expected, and therefore the operator is encouraged to quickly prepare a replacement.

In step S16, the predetermined time and the predetermined rotational speed are set to normal values (preset values), and processing is finished. The rated voltage and the rated rotational speed described herein may be replaced with a predetermined reference voltage and reference rotational speed different from the rated voltage and the rated rotational speed.

(Abnormality Decision Processing)

Figure 7:
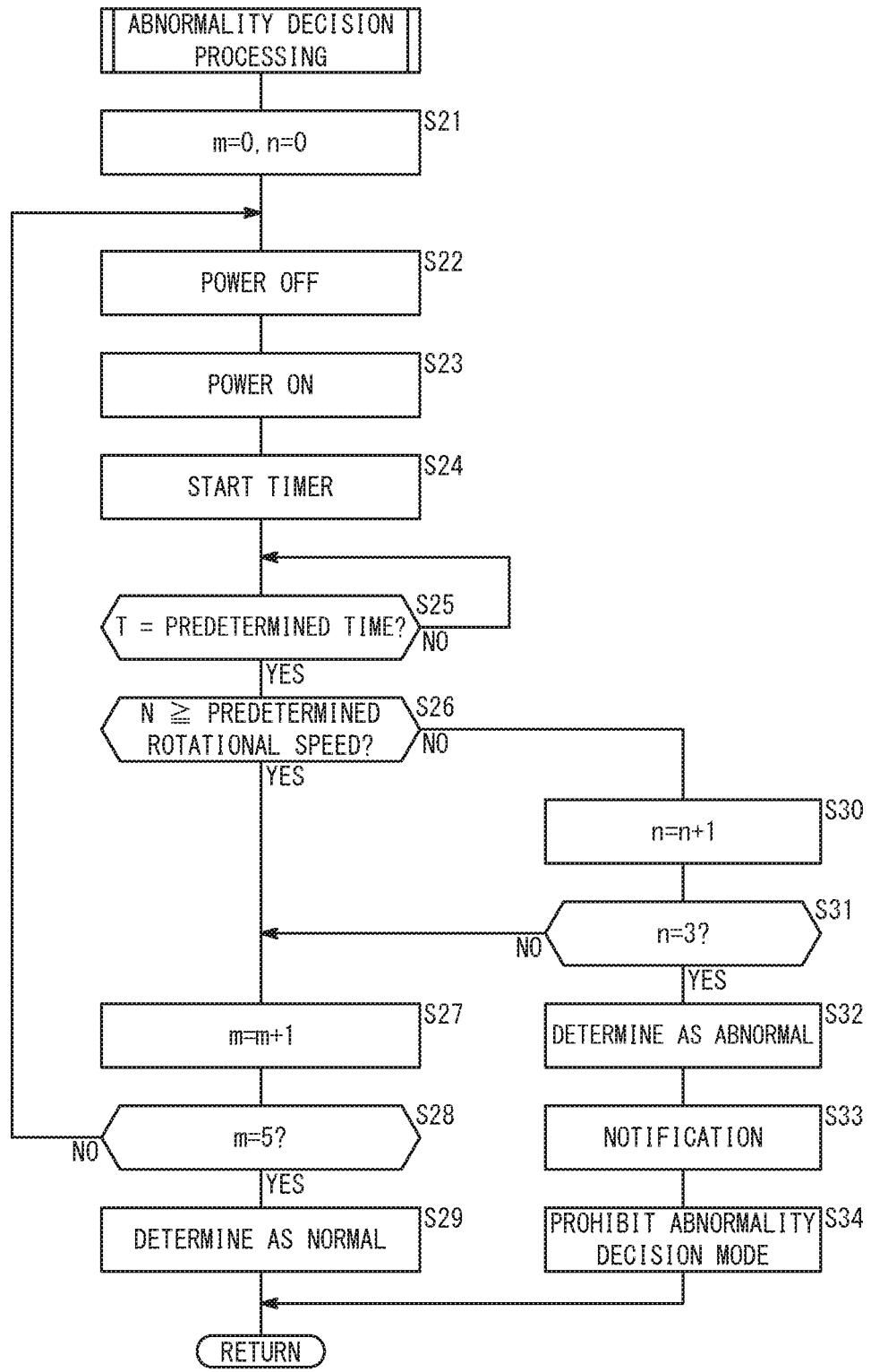
FIG. 7 is a flowchart illustrating a process of making a decision on fan motor abnormality.

FIG. 7 is a flowchart illustrating a process of making a decision on the abnormality of the fan motor 14. The same abnormality decision processing is performed on both of the fan motors 14A, 14B. Only the abnormality decision processing with respect to the fan motor 14A will be described.

In step S21, a variable m and a variable n are reset (0 is substituted in the variable m and the variable n), and the flow moves to step S22. In step S22, the fan motor 14A is powered off, and the flow moves to step S23. In step S23, the fan motor 14A is powered on, and the flow moves to step S24.

In step S24, a timer is started, and the flow moves to step S25. In step S25, an elapsed time T after the timer starts (the fan motor 14A is powered on) is judged whether to reach the predetermined time or not. When the elapsed time T has reaches the predetermined time, the flow moves to step S26. When the lapse time T does not reach the predetermined time, processing in step S25 is repeated to stand by.

In step S26, the rotational speed N of the fan motor 14A is judged whether to be equal to or greater than the predetermined rotational speed. When the rotational speed N of the fan motor 14A is the predetermined rotational speed or more, the flow moves to step S27. When the rotational speed N of the fan motor 14A is less than the predetermined rotational speed, the flow moves to step S30.

In step S27, the variable m is incremented, and the flow moves to step S28. In step S28, the variable m is judged whether it is "5" or not. When the variable m is "5", the flow moves to step S29. When the variable m is not "5", the flow returns to step S22. In the present embodiment, during one abnormality decision mode, the power supply to the fan motor 14A is repeatedly switched between off and on five times. Therefore, in step S28, the variable m is judged if it is "5". The number of times to repeatedly switch between off and on of the power supply to the fan motor 14A during the one abnormality decision mode may be arbitrarily set, and the condition in step S28 may be set according to the set number of switching. In step S29, the fan motor 14A is determined to be normal, and the processing is finished.

In step S30, the variable n is incremented, and the flow moves to step S31. In step S31, the variable n is judged whether it is "3". When the variable n is "3", the flow moves to step S32. When the variable n is not "3", the flow moves to step S27. In the present embodiment, the fan motor 14A is determined to be abnormal provided that the condition of step S26 is not satisfied at least three times while the power supply to the fan motor 14A is repeatedly switched between off and on five times. Therefore, in step S31, the variable n is judged whether it is "3". The number of times that the condition of step S26 is not satisfied may be arbitrary set, and a condition of step S31 may be set according to the set number of times. In step S32, the fan motor 14A is decided as abnormal, and the flow moves to step S33.

In step S33, the notification unit 22 notifies the abnormality to the operator, and the flow moves to step S34. In step S34, execution of the abnormality decision mode with respect to the fan motor 14A is prevented, and the processing is finished.

[Control of Fan Motor Determined as Abnormal]

When, for example, judging the fan motor 14A as abnormal, the abnormality decision control unit 28 controls the rotational speed of the fan motor 14A to become higher than a rotational speed before the fan motor 14A was judged to be as abnormal. Consequently, when dust adheres to the fan motor 14A, it is possible to blow the dust away by increasing the rotational speed of the fan motor 14 to, return the fan motor 14 into a normal state.

[Control of Other Fan Motor after Decision of Abnormality]

When, for example, judging the fan motor 14A as abnormal, the abnormality decision control unit 28 controls the rotational speed of the fan motor 14B to be higher than a rotational speed before the fan motor 14A was judged to be as abnormal. With this arrangement, the other fan motor 14B can make up for lowered performance for cooling the CPU 16 or the like caused by the abnormality of the one fan motor 14A. Subsequently after the replacement judgement unit 30 decides that the fan motor 14A has been replaced, the fan motor control unit 26 normally controls the fan motor 14B.

[Replacement judgement Unit]

The replacement judgement unit 30 has unique identification numbers of the fan motor 14A and the fan motor 14B, respectively. The identification numbers may be input to the replacement judgement unit 30 through an unillustrated input unit. In the present embodiment, the processing (the compensation process of compensating the predetermined time and the predetermined rotational speed) in step S1 to step S4 illustrated in FIG. 4 is performed. This compensation process of compensating the predetermined time and the predetermined rotational speed may not be performed. Further, the abnormality decision processing with respect to the fan motor A (or the fan motor B) is carried out in current processing only when the previous processing determined that the fan motor 14A (or the fan motor 14B) is normal. However, even after the fan motor 14A (or the fan motor 14B) is determined as abnormal, the abnormality decision processing may be performed.

Even when the compensation process of compensating the predetermined time and the predetermined rotational speed is not performed or when the abnormality decision processing is carried out even after the fan motor 14A (or the fan motor 14B) is determined as abnormal, the replacement judgement unit 30 may judge that the fan motor 14A and the fan motor 14B have been replaced in the following manner. For example, in case where after the abnormality decision control unit 28 had determined the fan motor 14A as abnormal, the numerical control device (CPU 16) was turned off, and then turned on, if the abnormality decision control unit 28 does not judge the fan motor 14A as abnormal, the replacement judgement unit 30 decides that the fan motor 14A has been replaced.

[Function and Effect]

The abnormality decision with respect to the fan motor 14 is performed when the power supply to the fan motor 14 is switched from off to on or from on to off. Particularly when the power supply to the fan motor 14 is switched from off to on, the fan motor 14 is driven from a stop state. Therefore, static friction significantly influences on the rise of the rotational speed of the fan motor 14, so that it is easy to find abnormality of the fan motor 14.

However, according to a normal control of the fan motor 14, the power supply to the fan motor 14 is switched from off to on when the CPU 16 or the like is activated, or the power supply to the fan motor 14 is switched from on to off after the CPU 16 or the like is stopped. Hence, the power supply to the fan motor 14 is switched from off to on or from on to off only at a few occasions, providing limited opportunities to determine abnormality of the fan motor 14. Therefore, it has been difficult to improve abnormality decision control with respect to the fan motor 14. Even when there is a state where the fan motor 14 is supposed to be abnormal during the operation of the CPU 16, it is not possible to determine if the fan motor 14 is abnormal during the operation of the fan motor 14.

The function and the effect of the present embodiment will be described below. A case where the abnormality decision mode is executed with respect to the fan motor 14A and the fan motor 14A is determined as abnormal will be described as an example. When the abnormality decision mode is executed with respect to the fan motor 14B and the fan motor 14B is determined as abnormal, explanation may be regarded as the same except that control and the function of the fan motor 14A and control and a function of the fan motor 14B described below are applicable in reverse.

In the present embodiment, the fan motor control device 10 that controls driving of the fan motor 14A that cools the CPU 16 (a device that generates heat during the operation) includes the rotational speed sensor (rotational speed detecting unit) 20A that detects the rotational speed of the fan motor 14A, and the abnormality decision control unit 28 that executes the abnormality decision mode of repeatedly switching between on and off of the power supply to the fan motor 14A during the operation of the CPU 16, and determines abnormality of the fan motor 14A based on the rotational speed of the fan motor 14A during execution of the abnormality decision mode.

Consequently, the abnormality decision control unit 28 can judge abnormality of the fan motor 14A plural times even during the operation of the CPU 16. Therefore, it is possible to improve abnormality decision accuracy with respect to the fan motor 14A. Further, it is possible to determine the abnormality of the fan motor 14A during the operation of the CPU 16, and detect the abnormality of the fan motor 14A at an early stage.

In a case where the abnormality decision control unit 28 detects that the rotational speed of the fan motor 14A fails to reach the preset predetermined rotational speed within the preset predetermined time after the fan motor 14A is powered on during the execution of the abnormality decision mode, the abnormality decision control unit 28 decides the fan motor 14A as abnormal.

With this arrangement, it is possible to determine abnormality of the fan motor 14A at a time when the abnormality of the fan motor 14A can be easily detected because of the significant influence of the static friction on the rise of the rotational speed of the fan motor 14A. As a result, the abnormality decision accuracy can be improved.

When the abnormality decision control unit 28 detects the set number of times that the rotational speed of the fan motor 14A fails to reach the preset predetermined rotational speed within the preset predetermined time after the fan motor 14A is powered on during the execution of the abnormality decision mode, the abnormality decision control unit 28 determines that the fan motor 14A is abnormal. With this arrangement, it is possible to reduce a risk that the fan motor 14A is erroneously determined as abnormal, so that the abnormality decision accuracy with respect to the fan motor 14A can be improved.

When the fan motor 14A is replaced and then the replaced fan motor 14A is controlled to be driven for the first time, the abnormality decision control unit 28 compensates the predetermined time and the predetermined rotational speed used for abnormality decision. When the steady rotational speed in a case of power supply of the rated voltage (predetermined reference voltage) to the fan motor 14A is smaller than the first rotational speed threshold that is a rotational speed lower than the rated rotational speed (predetermined reference rotational speed) and is equal to or more than the second rotational speed threshold that is the rotational speed smaller than the first rotational speed threshold, the abnormality decision control unit 28 sets the predetermined time to be longer than the preset time or sets the predetermined rotational speed to be lower than the preset rotational speed. When the rated rotational speed of the fan motor 14A is smaller than the second rotational speed threshold, the abnormality decision control unit 28 sets the predetermined time to be shorter than the preset time or sets the predetermined rotational speed to be higher than the preset rotational speed.

Consequently, it is possible to set the predetermined time or the predetermined rotational speed to be used for the abnormality decision with respect to the fan motor 14A according variation in products of the fan motor 14A. As a result, the abnormality decision can be made according to the variation in products of the fan motor 14A.

When the fan motor 14A is replaced and then the replaced fan motor 14A is controlled to be driven for the first time, the abnormality decision control unit 28 compensates the predetermined time and the predetermined rotational speed to be used for the abnormality decision. When the steady rotational speed in a case of the power supply of the rated voltage (predetermined reference voltage) to the fan motor 14A is greater than the third rotational speed threshold that is the rotational speed higher than the predetermined reference rotational speed, the abnormality decision control unit 28 sets the predetermined time to be shorter than the preset time or sets the predetermined rotational speed to be higher than the preset rotational speed.

Consequently, it is possible to set the predetermined time or the predetermined rotational speed to be used for the abnormality decision with respect to the fan motor 14A according to the variation in products of the fan motor 14A. As a result, the abnormality decision can be made according to the variation in products of the fan motor 14A.

The fan motor control device 10 includes the replacement judgement unit 30 that judges that the fan motor 14A has been replaced. When the abnormality decision control unit 28 determines that the fan motor 14A is abnormal, the abnormality decision control unit 28 controls the fan motor 14B other than the fan motor 14A at a higher rotational speed compared to that before the determination of abnormality of the fan motor 14A. Consequently, the fan motor 14B can make up for the degradation of performance in cooling the CPU 16 and the like caused by the abnormality of the fan motor 14A.

After the abnormality decision control unit 28 determines the abnormality of the fan motor 14A, when the power supply to the numerical control device (CPU 16) is turned off, and subsequently turned on, provided that the abnormality decision control unit 28 does not determine the fan motor 14A as abnormal, the replacement judgement unit 30 judges that the fan motor 14A has been replaced. To determine that the fan motor 14A has been replaced, the replacement judgement unit 30 may read an individual identification number of the fan motor 14A. However, hardware that reads the individual identification numbers needs to be added and is concerned to lead to an increase in cost. In contrast, by determining that the fan motor 14A has been replaced as described above, it is not necessary to add the hardware, and it is possible to suppress an increase in cost.

The fan motor control device 10 includes the notification unit 22 that notifies an abnormality when the abnormality decision control unit 28 determines the fan motor 14A as abnormal. After the notification unit 22 notifies the abnormality, the abnormality decision control unit 28 prevents the abnormality decision mode from being executed with respect to the fan motor 14A determined as abnormal.

A large torque is required to drive the fan motor 14A from a stop state compared to a torque at a steady rotation. Once the fan motor 14A determined as abnormal is stopped, the fan motor 14A may not be driven again. The fan motor 14A determined as abnormal is avoided from being stopped by the abnormality decision mode, so that it is possible to reduce the possibility that the fan motor 14A is not driven again.

When the abnormality decision control unit 28 determines that the fan motor 14A is abnormal, the abnormality decision control unit 28 controls the fan motor 14A at a rotational speed higher than a rotational speed before the determination of the abnormality of the fan motor 14A.

With this arrangement, when dust adheres to the fan motor 14A, it is possible to blow the dust away by increasing the rotational speed of the fan motor 14A, so that the fan motor 14A returns to a normal state.

The abnormality decision control unit 28 executes the abnormality decision mode with respect to one fan motor 14A among a plurality of fan motors 14A, 14B, and does not simultaneously execute the abnormality decision mode with respect to the plurality of fan motors 14A, 14B. Therefore, the performance in cooling the CPU 16 can be prevented from lowering.

While executing the abnormality decision mode with respect to one fan motor 14A among the plurality of fan motors 14A, 14B, the abnormality decision control unit 28 controls the other fan motor 14B at a rotational speed higher than the rotational speed before the abnormality decision mode is executed with respect to the one fan motor 14A. Consequently, the other fan motor 14B can make up for the degradation in the performance in cooling the CPU 16 or the like caused when the abnormality decision mode is being executed with respect to the one fan motor 14A.

Other Embodiments

The present invention has been described above based on the first embodiment. A specific configuration of each invention is not limited to the embodiment, and design changes made without departing from the scope of the present invention are incorporated in the present invention.

The abnormality decision with respect to the fan motor 14 in a case where the power supply to the fan motor 14 is switched from on to off can be also performed in the substantially same manner. In this regard, the processing of setting the predetermined time and the predetermined rotational speed used for the abnormality decision with respect to the fan motor 14 in step S12 illustrated in FIG. 5 as "setting the predetermined time longer than the preset time (or setting the predetermined rotational speed lower than the preset rotational speed)." should be replaced with "setting the predetermined time shorter than the preset time (or setting the predetermined rotational speed lower than the preset rotational speed)."

What is claimed is:

1. A fan motor control device configured to control driving of a fan motor for cooling a device that generates heat during operation, the fan motor control device comprising:
   a rotational speed sensor configured to detect a rotational speed of the fan motor; and
   a processor configured to
      execute an abnormality decision mode of repeatedly switching between on and off of power supply to the fan motor during the operation of the device, and
      judge abnormality of the fan motor at each time after switching the power supply between on and off, based on the rotational speed of the fan motor during the execution of the abnormality decision mode.

2. The fan motor control device according to claim 1, wherein the processor is further configured to judge that the fan motor is abnormal in a case where the processor determines that the rotational speed of the fan motor fails to reach a preset predetermined rotational speed within a preset predetermined time after the fan motor is powered on during the execution of the abnormality decision mode.

3. The fan motor control device according to claim 1, wherein the processor is configured to determine that the fan motor is abnormal in a case where the processor determines that there is a set number of times when the rotational speed of the fan motor fails to reach a preset predetermined rotational speed within a preset predetermined time after the fan motor is powered on during the execution of the abnormality decision mode.

4. The fan motor control device according to claim 2, wherein the processor is further configured to judge that the fan motor has been replaced,
   wherein in a case where the fan motor is drive-controlled for a first time since the processor judged that the fan motor had been replaced, the processor is configured to compensate the predetermined time and the predetermined rotational speed,
   wherein the predetermined time is compensated to be longer than a preset time or the predetermined rotational speed is compensated to be lower than a preset rotational speed, if a steady rotational speed, which is a rotational speed of the fan motor supplied with electric power at a predetermined reference voltage, is lower than a first rotational speed threshold that is a rotational speed lower than a predetermined reference rotational speed and equal to or higher than a second rotational speed threshold that is a rotational speed lower than the first rotation threshold, and
   wherein the predetermined time is compensated to be shorter than the preset time or the predetermined rotational speed is compensated to be higher than a preset rotational speed, if the steady rotational speed of the fan motor is lower than the second rotational speed threshold.

5. The fan motor control device according to claim 2, wherein the processor is further configured to judge that the fan motor has been exchanged,
   wherein in a case where the fan motor is drive-controlled for a first time since the processor judged that the fan motor had been exchanged, the processor is configured to compensate the predetermined time and the predetermined rotational speed, and
   wherein the predetermined time is set to be shorter than the preset time or the predetermined rotational speed is set to be higher than a preset rotational speed if a steady rotational speed, which is a rotational speed of the fan motor supplied with electric power at a predetermined reference voltage, is higher than a third rotational speed threshold that is a rotational speed higher than a predetermined reference rotational speed.

6. The fan motor control device according to claim 1, further comprising:
a plurality of the fan motors,
wherein the processor is further configured to judge that the fan motors have been replaced,
wherein when the processor determines that one of the fan motors is abnormal, the processor is configured to control another of the fan motors to be driven at a rotational speed higher than a rotational speed before determination of abnormality of the one of the fan motors, until the one of the fan motors determined as abnormal is replaced.

7. The fan motor control device according to claim 6,
wherein the processor is further configured to judge that the one of the fan motors has been replaced, provided that the one of the fan motors is not determined as abnormal by the processor after having been determined as abnormal and after the device is powered off, and subsequently powered on.

8. The fan motor control device according to claim 1, further comprising a notification device configured to notify, through at least one or a combination of sounds, characters, images, or light, that the processor determines the fan motor as abnormal,
wherein the processor is configured to prevent the abnormality decision mode from being executed with respect to the fan motor determined as abnormal, after notification by the notification device.

9. The fan motor control device according to claim 1, wherein the processor is further configured to control the fan motor that has been determined as abnormal to increase the rotational speed compared to the rotational speed before determination of the abnormality of the fan motor.

10. The fan motor control device according to claim 1, further comprising a plurality of the fan motors,
wherein the processor is further configured to
execute the abnormality decision mode with respect to one of the fan motors among the plurality of fan motors, and
not simultaneously execute the abnormality decision mode with respect to the reminder of the plurality of fan motors.

11. The fan motor control device according to claim 10, wherein while the processor is executing the abnormality decision mode with respect to the one of the plurality of fan motors, the processor is configured to control another of the fan motors to increase the rotational speed compared to the rotational speed before execution of the abnormality decision mode with respect to the one of the fan motors.

12. A fan motor controlling method for controlling driving of a fan motor for cooling a device that generates heat during operation, the fan motor controlling method comprising:
a rotational speed detecting step by a rotational speed sensor detecting a rotational speed of the fan motor; and
an abnormality decision controlling step by a processor executing an abnormality decision mode of repeatedly switching between on and off of power supply to the fan motor during the operation of the device, and determining abnormality of the fan motor at each time after switching the power supply between on and off, based on the rotational speed of the fan motor during the execution of the abnormality decision mode.

13. The fan motor controlling method according to claim 12, wherein, in the abnormality decision controlling step, the fan motor is judged to be abnormal in a case where the rotational speed of the fan motor fails to reach a preset predetermined rotational speed within a preset predetermined time after the fan motor is powered on during the execution of the abnormality decision mode.

14. The fan motor controlling method according to claim 12, wherein, in the abnormality decision controlling step, the fan motor is determined as abnormal in a case where the rotational speed of the fan motor fails to reach a preset predetermined rotational speed within a preset predetermined time for a set number of times after the fan motor is powered on during the execution of the abnormality decision mode.

15. The fan motor controlling method according to claim 13, further comprising a replacement judgement step of judging that the fan motor has been replaced,
wherein in a case where the fan motor is drive-controlled for a first time since the fan motor was replaced, in the abnormality decision control step, the predetermined time and the predetermined rotational speed are compensated,
wherein the predetermined time is compensated to be longer than a preset time or the predetermined rotational speed is compensated to be lower than a preset rotational speed, if a steady rotational speed, which is a rotational speed of the fan motor supplied with electric power at a predetermined reference voltage, is lower than a first rotational speed threshold that is a rotational speed lower than a predetermined reference rotational speed and equal to or more than a second rotational speed threshold that is a rotational speed lower than the first rotation threshold, and
wherein the predetermined time is compensated to be shorter than the preset time or the predetermined rotational speed is compensated to be higher than a preset rotational speed, if the steady rotational speed of the fan motor is lower than the second rotational speed threshold.

* * * * *